March 24, 1970     N. E. ALEXANDER     3,502,559

BIOELECTROCHEMICAL TRANSDUCER

Filed Dec. 28, 1966

INVENTOR.
Nelson E. Alexander

ATTORNEYS

United States Patent Office 3,502,559
Patented Mar. 24, 1970

3,502,559
BIOELECTROCHEMICAL TRANSDUCER
Nelson E. Alexander, Frederick, Md., assignor to the United States of America as represented by the Secretary of the Army
Filed Dec. 28, 1966, Ser. No. 605,523
Int. Cl. G01n 27/02; C12k 1/04
U.S. Cl. 204—195                                8 Claims

ABSTRACT OF THE DISCLOSURE

A bioelectrochemical device having two chambers containing a cathode and anode which are immersed in a biological organism inoculated electrolyte, wherein the growth and metabolism of the biological organism generates an electrical current indicative of its activity.

---

The invention described herein may be manufactured and used for or by the Government of the United States of America for governmental purposes without the payment to me of any royalty thereon.

This invention relates in general to a bioelectrochemical transducer having utility in the detection of biological activity and more particularly to a transducer which translates the growth and metabolism of microorganisms into discrete quantities of measurable electricity.

It is well known that microorganisms change the oxidation reduction potential of the culture medium in which they grow and metabolize. Microorganisms have the ability to couple, through enzymatic activity, the necessary chemical reactions that raise or lower the electronic charge of an electrolyte in a compartment containing the culture medium. This charge is transferred to electrodes positioned within the media. When the two electrodes are connected through an external circuit, the quantity of charge transferred is the important datum indicative of metabolic activity transduced to electric energy.

The present bioelectrochemical transducer comprises two biologically controlled environments separated by a salt and agar plug. These two biologically controlled environments are the two-half-cells of the transducer. Anaerobic organisms are positioned in one of the half-cells and aerobic organisms are positioned in the other. Either half-cell can be used as a test ecology in which the effect of stimulants, contaminants, poisons or other parameters may be tested.

When the organisms in both half-cells are healthy and growing, a potential appears at the terminals of the cells. However, the potential is not measured, since it is a function of many variables and the electrical and electrochemical parameters of the system. The same may be said of the short term current flow. In this invention terminals are connected to a fixed load resistance and the yield of electrical energy is measured in any suitable manner, e.g., by the utilization of a coulometer or a microwattmeter.

It is an object of the invention to provide and disclose a bioelectrochemical device sensitive to biological activities.

It is a further object of the invention to provide and disclose a bioelectrochemical device, wherein the coulomb output is a measure of the relative number and metabolic activity of the organisms.

It is a further object of the invention to provide and disclose a bioelectrochemical device wherein photoenergy is used at the anode to promote the electron flow related to biological activity.

It is a further object of the invention to provide and disclose a bioelectrochemical device wherein the organisms utilized therein obtain nutrients from the electrolyte that is supplemented by ion movement through a salt bridge positioned at the bottom of the half-cell.

It is a further object of the invention to provide and disclose a bioelectrochemical device wherein the biological organisms utilized therein depolarize the electrode reactions at one or both electrodes.

Other objectives and a fuller understanding of the invention may be had by referring to the following description and claims taken in conjunction with the accompanying drawing in which:

Figure 1:
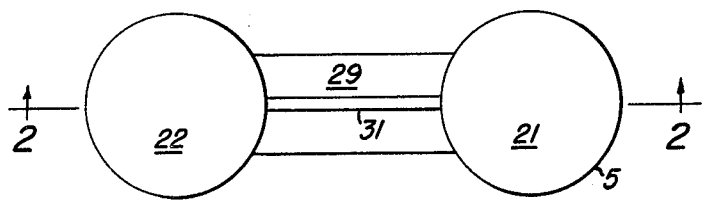
FIG. 1 shows a top view of the bioelectrochemical device.
Figure 2:
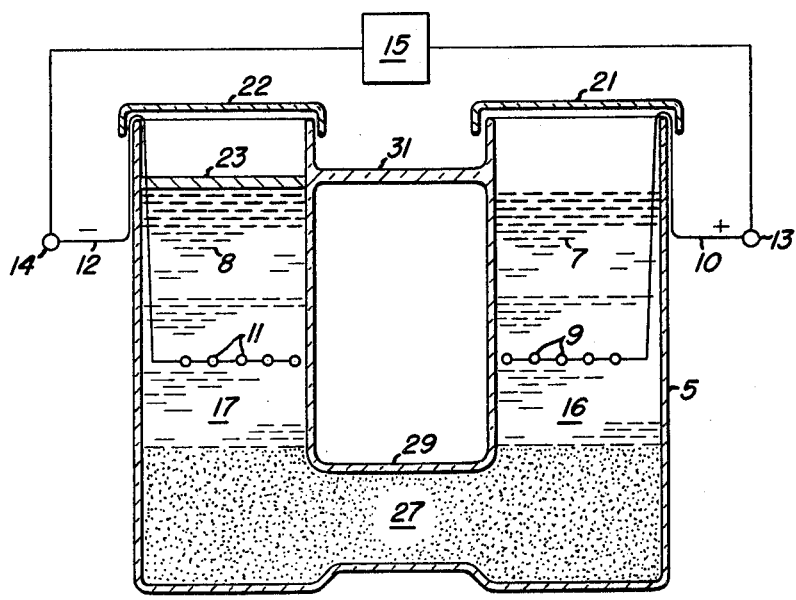
FIG. 2 is a view through section 2—2 of FIG. 1.

Referring now to the drawings, a specific example of a device of the type according to the present invention comprises U shaped casing 5, as shown in FIG. 2. Casing 5 may be constructed of any suitable material which is inert to its contents, e.g., glass. The casing comprises twin cylindrical compartments each with an open top section and a closed bottom section. The twin cylindrical compartments of casing 5 are connected by cylindrical port 29 and are divided into compartments 16 and 17, which comprise the two half-cells of the device by agar plug 27. Brace 31, which is positioned horizontally between opposing walls near the open ends of compartments 16 and 17, adds stability and support thereto. Compartment covers 21 and 22, which comprise a circular configuration having downwardly extending sides, are of a size sufficient to envelope the open top section of compartments 16 and 17. Compartment covers 21 and 22 may be constructed of a material identical to the casing 5, e.g., glass. Compartments 16 and 17 of electrolyte casing 5 contain aqueous electrolytes 7 and 8, respectively, into which are submerged electrodes 9 and 11, that may be spirals of wire of a suitable metal. The pair of electrodes are connected through conductors 10 and 12 to terminals 13 and 14, respectively, between which measuring load, 15, e.g., a coulometer, is interposed. A porous barrier 27, e.g., a salt-agar bridge of suitable composition, e.g., comprising 5% salt and 10% agar, is maintained in the bottom section of electrolyte casing 5. This bridge, porous plug, or barrier, restricts the organisms and electrolytes within the confines of their respective half-cells. In addition, the salt-agar bridge can be utilized to supply a continuous source of supplemental nutrients to the biological organism in the half-cells, by including those salts common to both half-cells.

The electrolyte utilized may be any aqueous material capable of transmitting ions between electrodes 9 and 11, compatible with and capable of supplying essential nutrients to the biological organisms exposed to the electrolyte, e.g., aqueous saline solutions, aqueous alkaline solutions or weak acids. In the present device an aqueous electrolyte composed of the following compounds in the amounts designated per liter of solution was utilized in half-cells 17 in conjunction with *Desulfovibrio desulfuricans* organism. The solution was adjusted to a pH of 7.0:

|  | Grams |
|---|---|
| $K_2HPO_4$ | 0.5 |
| $KH_2PO_4$ | 1.0 |
| $MgSO_4 \cdot 7H_2O$ | 1.0 |
| $NH_4Cl$ | 1.0 |
| $Na_2SO_4$ | 1.0 |
| $Fe(NH_4)SO_4 \cdot 6H_2O$ | 0.1 |
| Sodium lactate, 4.0 mls. | |

An aqueous electrolyte composed of the following compounds in the amounts designated per liter of solution was utilized in half-cell 16 in conjunction with Scenedesmus or Chlorella algae. The resultant medium was adjusted to a pH of 7.0 for the Scenedesmus algae and to a pH of 5.5 for the Chlorella algae:

| | Grams |
|---|---|
| $KNO_3$ | 1.0 |
| $KH_2PO_4$ | 0.135 |
| $MgSO_4 \cdot 7H_2O$ | 0.500 |
| $FeSO_4$ | 0.020 |
| Micronutrients, 1.01 mls. | |

The micronutrients were composed of the following compounds in the amounts designated per liter of solution:

| | Micromoles |
|---|---|
| $H_3BO_3$ | 50.0 |
| $MnSO_4$ | 13.0 |
| $ZnSO_4$ | 1.0 |
| $CuSO_4$ | 0.5 |
| $(NH_4)_6Mo_7O_{24} \cdot 4H_2O$ | 0.5 |

Anode 9 is composed of any suitable metal, e.g., platinum. Cathode 11 is composed of any suitable metal which is preferably less noble in the electromotive series than the anode, e.g., iron. The conductors are constructed of any suitable conducting material, e.g., copper.

Referring now to FIG. 2 for a specific example of the operations of the present device, salt-agar composition 27 is positioned in the bottom of electrolyte casing 5. Anaerobic half-cell 17, which contains the negative electrode, is filled to a point substantially near the top thereof with the electrolyte prepared as heretofore described. The anaerobic half-cell is then inoculated with *Desulfovibrio desulfuricans* bacterial suspension in an amount of one milliliter containing approximately $10^6$ organisms. The half-cell is sealed with sealant 23 at a point substantially near the top section thereof. Sealant 23 may be any suitable material, e.g., wax or oil. Cover glass 22 completes the enclosure of half-cell 17.

Aerobic half-cell 16, which contains the positive electrode, is filled to a point substantially near the top thereof with the electrolyte prepared as heretofore described. The half-cell is inoculated with a suitable algae, e.g., Scenedesmus or Chlorella algae. A whisp of sterile cotton may be added to half-cell 16 to provide physical support for the growing algae. The open top section of half-cell 16 is enclosed by glass cover 21.

The electrochemical activity of the cell is considered to proceed as follows: In half-cell 16 containing the platinum anode, the algae, i.e., Scenedesmus or Chlorella, contained in the electrolyte confined therein, generates oxygen, i.e., $O_2$, due to photosynthetic metabolic processes of the algae. The generated oxygen acts as an electron sink in the presence of platinum anode 9, i.e., the electrons are absorbed at the positive electrode. As a result thereof, hydroxyl ions are produced. Therefore platinum anode 9 assumes a potential approaching that of a saturated oxygen electrode reflecting an electron deficiency in the electrolyte.

Iron cathode 11, which is immersed in electrolyte 8 of half-cell 17, tends to form spontaneously metallic ions and free electrons. The oxidation of the iron is accompanied by the generation of hydrogen. The biological organisms, i.e., *Desulfovibrio desulfuricans*, confined within half-cell 17, act as depolarizers in the bioelectrochemical transducer by consuming the generated hydrogen. On open circuit, the generated hydrogen causes the potential of the negative electrode to approach that of a saturated hydrogen electrode.

When the positive and negative terminals are connected to the resistance of the measuring circuit the resulting flow of electrons initiates polarization in the form of an excessive accumulation of hydrogen gas on cathode 11 partially insulating it and depletion of the accumulated oxygen on anode 9. The rate of microbial depolarization represented by the consumption of hydrogen at cathode 11 or generation of oxygen at anode 9 determines the output of the transducer, i.e., the total electron flow per unit of time and is the measure of microbial metabolic rate.

Any disturbance of the steady state condition when established such as a change of temperature, light, or introduction of noxious gases or poisonous particles will alter the metabolic rate of the organisms and cause a change on the electrical output of the biological transducer that can be used to cause a warning signal for personnel to take appropriate action. Water contaminants could be detected upon introduction into the anaerobic half-cell and air contaminants in the aerobic half-cell.

Although I have described my invention with a certain degree of particularity, it is understood that the present disclosure has been made by way of example and that numerous changes in the detail of construction and arrangement of parts may be resorted to without departing from the spirit and scope of the invention.

Having defined my invention, I claim:

1. A bioelectrochemical transducer comprising: a casing having an open top section, the upper portion of the casing divided into two compartments thereby forming two half-cells, covering means therefor, electrical bridging means positioned at the bottom of the casing thereby separating the two half-cells, an anaerobic organism inoculated electrolyte positioned in one half-cell, and an aerobic organism inoculated electrolyte positioned in the other half-cell, a cathode immersed in said anaerobic inoculated electrolyte, an anode immersed in said aerobic inoculated electrolyte, the cathode-containing half-cell sealed near the top section thereof, the cathode and anode connected through conductor means to terminal means, a measuring device interposed between the terminal means.

2. A device in accordance with claim 1 wherein the measuring device comprises a coulometer.

3. A device in accordance with claim 1 wherein a salt-agar bridge positioned at the botttom of the casing is a supply of nutrients for said organisms.

4. A device in accordance with claim 1 wherein the electrolytes are supplies of nutrients for said organisms.

5. A device in accordance with claim 1 wherein the casing is made of glass.

6. A device in accordance with claim 1 wherein a biological organism capable of generating oxygen is contained in one half-cell and a hydrogen consuming biological organism is contained in the other half-cell.

7. A device in accordance with claim 6 wherein the oxygen generating biological organism is selected from the group consisting of Scenedesmus and *Chlorella pyrenocdosa*.

8. A device in accordance with claim 6 wherein the hydrogen consuming biological organism is *Desulfovibrio desulfuricans*.

References Cited

UNITED STATES PATENTS

| 3,001,917 | 9/1961 | Scheirer | 204—195 |
| 3,131,348 | 4/1964 | Taylor et al. | 204—195 |
| 3,228,799 | 1/1966 | Rohrback | 136—86 |
| 3,331,705 | 7/1967 | Davis et al. | 136—86 |
| 3,336,161 | 8/1967 | Sutton et al. | 136—86 |
| 3,403,081 | 9/1968 | Rohrback et al. | 204—195 |

T. TUNG, Primary Examiner

U.S. Cl. X.R.

136—86, 120